United States Patent [19]

Momata et al.

[11] Patent Number: 4,695,909
[45] Date of Patent: Sep. 22, 1987

[54] MAGNETIC HEAD ASSEMBLY

[75] Inventors: Kazuhiro Momata, Chigasaki; Yoshinori Dekura, Ebina; Tadashi Honzawa; Hiromi Matsushige, both of Odawara, all of Japan

[73] Assignee: Hitachi, Ltd., Tokyo, Japan

[21] Appl. No.: 669,583

[22] Filed: Nov. 8, 1984

[30] Foreign Application Priority Data

Nov. 10, 1983 [JP] Japan ................... 58-211294

[51] Int. Cl.⁴ .............. G11B 5/187; G11B 5/29; G11B 15/64; G11B 5/10
[52] U.S. Cl. ......................... 360/122; 360/102; 360/121; 360/129
[58] Field of Search ............ 360/102, 103, 110, 121, 360/129, 130.21

[56] References Cited

U.S. PATENT DOCUMENTS 3,643,037 2/1972 Norwood .................... 360/102

FOREIGN PATENT DOCUMENTS 723659 3/1980 U.S.S.R. ................. 360/118

OTHER PUBLICATIONS

Aweida et al., "Antistick Transducer", IBM Tech. Disc. Bull., vol. 12, No. 5, Oct. 1969.
Nortronics Company, Inc., "Design Digest for Digital Magnetic Recording", 1971, pp. 14-29.

Primary Examiner—Stuart N. Hecker
Assistant Examiner—Benjamin E. Urcia
Attorney, Agent, or Firm—Antonelli, Terry & Wands

[57] ABSTRACT

A magnetic head for recording and reproducing information on and from a flexible magnetic recording tape. The active face of tape supporting protrusions formed in the magnetic head is so configured that the contacting area between the supporting protrusion and the recording tape is smaller at both end portions of the protrusion than an intermediate portion thereof as viewed in the direction widthwise of the recording tape, whereby improved contacting state and floating state between the magnetic head and the recording tape can be assured over the whole width of the flexible recording tape.

19 Claims, 7 Drawing Figures

MAGNETIC HEAD ASSEMBLY

BACKGROUND OF THE INVENTION

1. Field of the Invention

The present invention relates generally to a magnetic head assembly which is adapted to perfrom recording and reproduction on or from a flexible magnetic recording medium such as a magnetic tape. In particular, the invention concerns an improved active (or tape contacting) face configuration of the magnetic head assembly.

2. Description of the Prior Art

To have a better understanding of the invention, a hitherto known magnetic head assembly which the invention intends to improve will first be described in some detail. FIG. 1 of the accompanying drawings shows schematically in a perspective view a general structure of a magnetic head assembly destined to be used in conjunction with a flexible magnetic medium such as a magnetic tape, and FIG. 2 shows in a sectional view taken substantially along a single-dotted line II—II in FIG. 1 the structure of the magnetic head assembly in the vicinity of the tape-contact or active face portion thereof. It will be seen that the active head face which is positioned in opposition to the recording medium or tape is provided with a pair of supporting protrusions generally denoted by H which are juxtaposed with a space therebetween in the tape transporting direction and extend in the direction widthwise of the recording medium. The supporting protrusions H have surfaces brought into contact with the recording medium or tape and serve simultaneously to support the recording medium. Disposed within the magnetic head assembly internally of the supporting protrusions H are a number of magnetic cores exemplified by 7 and 8 which number corresponds to the number of the tracks to be formed on the recording medium, the magnetic cores 7 and 8 constituting parts of a recording head 1 and a reproducing head 2, respectively. A magnetic shield plate 6 is interposed between the recording heads 1 and the reproducing heads 2 for preventing magnetic leakage or cross-talk from occurring therebetween. The magnetic cores 7 and 8 are wound with coils 10 and 11, respectively, wherein the recording and the reproduction are effected through a recording gap 3 and a reproducing gap 4, respectively.

Lateral protrusions 16 play no part in the recording/reproducing operations and serve merely for facilitating the fabrication of the illustrated magnetic head assembly. These lateral protrusions 16 are of a substantially same configuration as that of the central supporting protrusions H.

It goes without saying that in order to obtain desirable recording/reproduction characteristics of the magnetic head assembly, the contacting state of the magnetic head with the recording medium as well as the floating state thereof has to be optimized and stabilized. In this connection, it is known that the contacting state of the magnetic head with the magnetic tape 9 and the floating state thereof can be optimized by selecting appropriate values for the factors R, L and $\alpha$ illustrated in FIG. 2, wherein the factor R represents a radius of curvature of the tape-contacting face of the magnetic head, L represents the width of the magnetic head in the transporting direction of the magnetic tape 9, and $\alpha$ represents an angle formed between the magnetic tape 9 and a tangent to the top of the active face of the magnetic head. By the way, the tape transporting direction is indicated by an arrow D in FIG. 2.

FIG. 3 shows, by way of example, an active face configuration of a hitherto known magnetic head (refer to Japanese Utility Model Application Laid-Open No. 174118/1981) in a sectional view taken along the recording gap 3 or the reproducing gap 4 in the direction widthwise of the magnetic tape. As will be seen in FIG. 3, grooves 5 are formed at such positions that the head width a (i.e. the width of the recording element or reproducing element array) is slightly narrower than that of the magnetic tape 9. The reason for providing these grooves 5 can be explained by the fact that unless the grooves 5 are provided, those portions of the recording and reproducing heads which are brought into contact with the edge portions of the magnetic tape 9 will be worn with a curvature due to abrasion, as is illustrated in FIG. 4, because the magnetic tape 9 is transported in contact with the magnetic head constantly over a predetermined region. As the consequence, the tape-contacting state of the magnetic head as well as the floating state of the tape will become unstable. With the provision of the grooves 5, it is intended to evade the shortcoming mentioned above.

In this conjunction, it should be mentioned that guide means (not shown) for guiding the magnetic tape 9 along both lateral edges thereof are usually provided in the vicinity of the magnetic head for positioning properly the magnetic tape 9 relative to the magnetic head in the direction widthwise of the tape 9. Accordingly, even when the grooves 5 are provided, lateral edge portions of the magnetic tape 9 undergo inevitably more or less deformation due to the guide means, as is illustrated in FIG. 3 by broken lines, resulting in that the contacting state of the tape with the magnetic head becomes unstable. This instability of the contacting state will become more significant as the flexural rigidity of the magnetic tape is increased, providing thus a cause for degrading the magnetic recording/reproduction characteristics of the magnetic head.

The undesirable phenomenon mentioned above can be mitigated to some extend by decreasing the values R and/or L or increasing the angle $\alpha$. However, these measures are not effective to any satisfactory degree, when the flexural rigidity of the magnetic tape 9 is high. To the contrary, when the configuration of the magnetic head is modified in the manner mentioned above, the abrasion of the magnetic head becomes significant, shortening eventually the use life of the magnetic head assembly.

FIG. 5 shows another example of the active face configuration of a hitherto known magnetic head (see Japanese Patent Publication No. 32131/1974) in a sectional view taken along the recording gap 3 or the reproducing gap 4 in the direction widthwise of the magnetic tape. This configuration differs from the one shown in FIG. 3 in that a plurality of slits 12 are formed between the individual head elements which constitute the recording or reproducing head.

It has been described that the recording and reproduction are effected in the state in which the magnetic head is in physical contact with the magnetic tape 9. This holds true only when observed macroscopically. However, when observed microscopically, an air gap 13 is produced because of a fine roughness of the surface of the magnetic tape as well as an intervention of air flowing in through the angular space defined by the aforementioned angle $\alpha$. The purpose of providing the slits 12 resides in improving the contacting state between the magnetic tape and the magnetic head by reducing the air pressure in the air gap 13 by means of the slits 12 when the air gap 13 can not be controlled even by selecting appropriately the factors R, L and α.

Since the slits 12 have to be formed between the adjacent head elements, respectively, limitation is inevitably imposed on the size of the slits. Besides, the slits must be formed in a uniform size independent of the positions thereof, namely, whether they are located at the center or middle portion or lateral or end portions of the head, so that the air pressure produced within the gap 13 is the same throughout all the slits. Consequently, the instability can not be evaded in the contacting state between the magnetic head and the magnetic tape 9 at both lateral sides due to deformation thereof, as is in the case of the magnetic head configuration described above in conjunction with FIG. 3.

SUMMARY OF THE INVENTION

It is therefore an object of the present invention to provide a magnetic head assembly of an improved structure in which the disadvantages of the hitherto known magnetic head assembly as described above are eliminated and which can assure the improved contacting state as well as the floating state between the magnetic head and the magnetic tape over the whole width of the tape notwithstanding possible deformation of the tape at edge portions thereof.

In view of the above and other objects which will become more apparent as the description proceeds, there is provided according to a general aspect of the invention, a magnetic head assembly in which the tape contacting face of magnetic head is so configured that the area over which the magnetic head is brought into contact with a flexible magnetic recording medium is reduced at both end portions as viewed in the direction widthwise of the flexible magnetic recording medium as compared with the contacting area at the center or middle portion, whereby the air pressure produced between the flexible magnetic recording medium and the magnetic head is decreased at both end portions when compared with the air pressure at the middle or center portion so that an improved contacting state and floating state can be realized over the whole width of the flexible magnetic recording medium notwithstanding of possible deformation of the flexible magnetic recording medium at both end portions thereof.

DESCRIPTION OF THE PREFERRED EMBODIMENTS

In the following, the invention will be described in detail in conjunction with the exemplary embodiments by referring to FIGS. 6 and 7.

Figure 6:
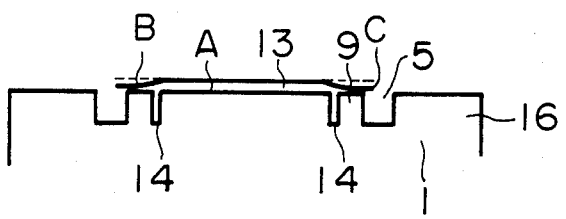
FIG. 6 is a view for illustrating a magnetic head configuration according to an embodiment of the present invention.

FIG. 6 shows schematically in a cross-sectional view taken along the recording gap or reproducing gap a configuration of a magnetic head according to an exemplary embodiment of the invention.

Figure 2:
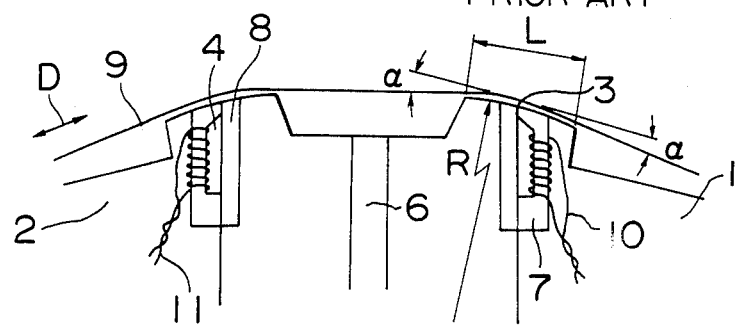
FIG. 2 is a sectional view of the same taken along the line II—II in FIG. 1.

As will be seen in FIG. 6, in the magnetic head according to the illustrated embodiment, a pair of grooves 14 are formed in the magnetic head in the vicinity of the lateral edges of the magnetic tape 9 in addition to the groove 5 mentioned hereinbefore. The groove 5 are so formed that the overall width of the supporting portion of the magnetic head (inclusive of portions A, B and C which are brought into contact with the magnetic tape 9) is slightly narrower than the width of the magnetic tape 9. The sectional configuration or shape of the magnetic head as viewed in the same direction as the magnetic head shown in FIG. 2 is so realized that the satisfactory contacting state is obtained at the center portion or region A as viewed in the direction widthwise of the magnetic tape by selecting appropriate values for the dimensional factors R, L and α, respectively. It has been found that the desirable contacting state can be realized at the center region A by selecting the factors R, L and α such that $R=20$ mm, $L=1.0$ mm and $\alpha=2.5°$, by way of example. Each of the grooves 14 may be formed between the outermost head element (as viewed widthwise of the tape) and the head element disposed adjacent thereto. By the way, it is presumed that the width and position of the tape in the tape transporting direction (i.e. the direction perpendicular to the plane of the drawing of FIG. 6) relative to the magnetic head are invariable.

On the active surface of the magnetic head, there is produced an air gap 13 upon traveling of the magnetic tape 9 because air flows in between the magnetic head and the magnetic tape 9. At that time, the air pressure within the air gap 13 is higher than the ambient pressure and is in reverse proportion to the volume of the gap 13. Thus, a static-pressure type foil bearing, so to say, is found due to the fact that balanced state is established at such a volume of the air gap that the difference between the pressure in the gap and the ambient pressure is balanced with the tension applied to the running magnetic tape 9. The foil bearing has a property that the pressure in the air gap tends to be increased as the contacting area increases.

When a pair of the grooves 14 are provided as in the case of the embodiment shown in FIG. 6, three foil bearings in total are formed at the center of middle region A of the supporting protrusion and at both end regions B and C, respectively. By forming each groove 14 at the location in the vicinity of the tape edge, the contacting area of the foil bearing realized at the center region A is greater than that of the foil bearings formed at the lateral end regions B and C, respectively, because the width of the tape as viewed in the tape traveling direction remains constant. As the consequence, the instantaneous pressure in the air gaps formed at both the lateral end regions B and C is smaller than that of the air gap formed at the center or middle region A. Accordingly, when no deformation is produced at the edge portions of the magnetic tape 9, the instantaneous volume of each air gap formed along the edge portions of the tape 9 is greater than that of the air gap formed at the middle portion of the tape 9, as is indicated by solid lines in FIG. 6, whereby a more stable contacting state can be assured.

On the other hand, when deformation is produced at the edge portions of the magnetic tape 9, the instantaneous pressures in the air gap produced at the middle portion A is substantially equal to those in the air gaps formed at both lateral or end portions B and C, as indicated by broken lines, whereby a desirable contacting state can be assured over the whole region in the direction widthwise of the tape. Since the groove 14 also serves as an escape groove of air, the width of the groove 14 should preferably be 20 μm or more.

In FIG. 6, only the recording magnetic head 1 is illustrated. However, it will be readily understood that the invention can equally be applied to the reproducing magnetic head.

Figure 1:
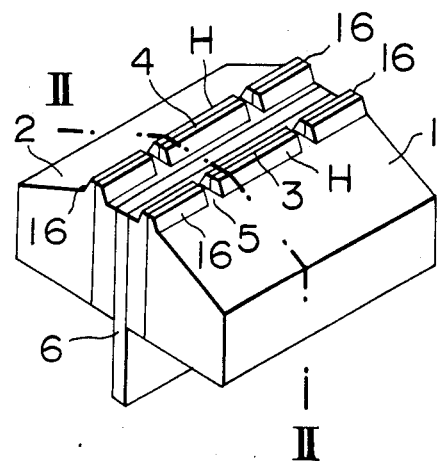
FIG. 1 is a perspective view of a hitherto known magnetic head assembly.
Figure 7:
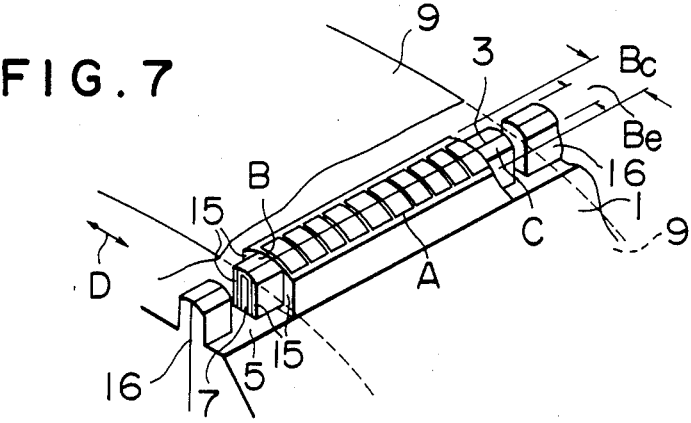
FIG. 7 is a perspective view showing a magnetic head structure according to another exemplary embodiment of the present invention.
Figure 3:
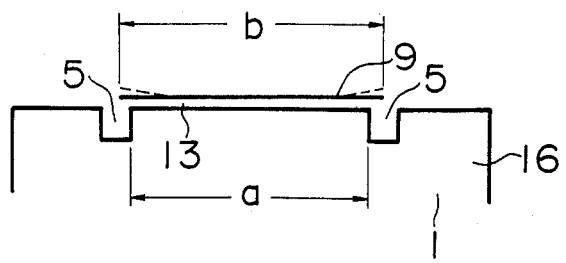
FIGS. 3, 4 and 5 are views for illustrating, respectively, contacting states hitherto known magnetic heads and a magnetic tape.
Figure 4:
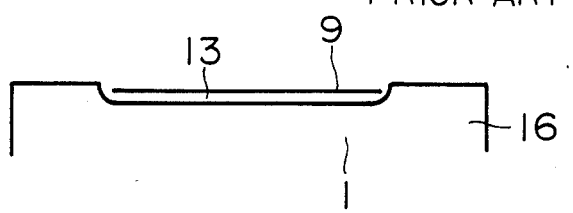
Figure 5:
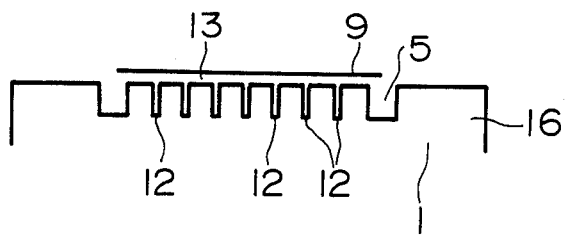

FIG. 7 shows in a perspective view an active face configuration of a magnetic head according to another embodiment of the invention, wherein like reference numerals denote like parts shown in FIGS. 1 and 2. In the case of this illustrative embodiment, the supporting protrusion which is brought into contact with the magnetic tape has a greater width Bc (as measured in the tape transporting direction indicated by an arrow D) than the width Be at the lateral end regions B and C. Accordingly, the contacting area between the magnetic tape 9 and the magnetic head at the middle region A is greater than those at the lateral end regions B and c, respectively, whereby the effects similar to those of the head structure shown in FIG. 6 can be obtained.

Since only a protecting film 15 is partially and selectively removed for narrowing the width of the magnetic head at both end regions B and C, the core 7 itself can remain intact throughout the whole length of the head. Accordingly, there arises no possibility that the magnetic recording/reproducing characteristics of the middle or intermediate region A differ from those of the end regions B and C.

Although only the recording head 1 is shown in FIG. 7, it is needless to say that the reproducing head 1 should be realized in the same structure as the recording head.

Further, although end projections 16 are shown as narrowed in the width in the tape transporting direction similarly to the end portions B and C of the supporting protrusion, it should be understood that the width of the projections 16 can be selected arbitrarily.

As will be appreciated from the foregoing description, the present invention teaches that the active face portion of the magnetic head be so configured that the contacting area (as viewed macroscopically) between the flexible recording medium and the magnetic head be made smaller at both lateral end regions than at a middle or intermediate region. According to the teaching of the invention, improved contacting or floating state can be realized over the whole surface of the flexible magnetic recording medium regardless of deformation thereof produced along the edge portions of the medium, whereby the magnetic recording and reproducing characteristics are significantly stabilized, to assure a high reliability of the recording/reproducing apparatus which employ the magnetic head assembly according to the invention.

What is claimed is:

1. A magnetic head for performing recording or reproduction on or from a flexible magnetic recording medium, wherein said magnetic head and said flexible recording medium are arranged to be movable relative to each other, and said flexible recording medium is movable in a transport direction, said magnetic head comprising:

an elongated surface member opposite to said flexible recording medium and receiving electromagnetic conversion means therein for enabling at least one of recording and reproduction, said elongated surface member being arranged for supporting said flexible recording medium through a fluid pressure during transport of said flexible recording medium, said elongated surface member having opposite end portions and a central portion therebetween, said elongated surface member extending in a direction transverse to the transport direction of said flexible magnetic recording medium; and fluid pressure reducing means provided in said elongated surface member proximate to both opposite end portions of said elongated surface member for enabling the fluid pressure existing between said flexible magnetic recording medium and said elongated surface member to be smaller in an area proximate to both opposite end portions than in an area at the central portion of said elongated surface member.

2. A magnetic head according to claim 1, wherein said flexible magnetic recording medium is a magnetic tape, and lateral edges of said magnetic tape are disposed proximate to the opposite end portions of said elongated surface member.

3. A magnetic head according to claim 2, wherein said magnetic tape has a width limited by the lateral edges thereof which is greater than the width limited by the opposite end portions of said elongated surface member.

4. A magnetic head according to claim 2, wherein said pressure reducing means includes cut-away portions formed in said elongated surface member proximate to the opposite end portions of said elongated surface member.

5. A magnetic head according to claim 4, wherein said cut-away portions includes grooves extending in the transport direction of said magnetic tape and formed in said elongated surface member proximate to the opposite end portions thereof.

6. A magnetic head according to claim 4, wherein said cut-away portions include the opposite end portions of said elongated surface member cut-away from said elongated surface member in the transport direction of the magnetic tape.

7. A magnetic head according to claim 6, wherein said cut-away opposite end portions of said elongated surface member have a smaller surface area than the surface area of the center portion of said surface member.

8. A magnetic head according to claim 1, wherein said electromagnetic conversion means include a plurality of electromagnetic elements cores aranged in said elongated surface member for enabling at least one of recording and reproduction on and from said flexible magnetic recording medium.

9. A magnetic head for performing recording or reproduction on or from a flexible magnetic recording medium, wherein said magnetic head and said flexible recording medium are arranged to be movable relative to each other, and said flexible magnetic recording medium is movable in a transport direction, said magnetic head comprising:

an elongated surface member opposite to said flexible magnetic recording medium and receiving a juxtaposed plurality of electromagnetic elements for recording and a plurality of electromagnetic elements for reproduction, said elongated surface member being arranged for supporting said flexible recording medium through a fluid pressure during transport of said flexible recording medium, said elongated surface member having opposite end portions and a central portion therebetween, said elongated surface member extending in a direction transverse to the transport direction of said flexible magnetic recording medium; and fluid pressure reducing means provided in said elongated surface member proximate to opposite end portions of said elongated surface member for enabling the fluid pressure existing between said flexible magnetic recording medium and said elongated surface member to be smaller in an area proximate to both opposite end portions than in an area at the central portion of said elongated surface member.

10. A magnetic head according to claim 9, further comprising magnetic shield plate means provided between said plurality of recording electromagnetic elements and said plurality of reproduction electromagnetic elements, said magnetic shield plate means extending in a direction transverse to the transport direction of said flexible magnetic recording medium, and said recording electromagnetic elements and said reproduction electromagnetic elements being arranged inside said elongated surface member at opposite sides of said magnetic shield plate means in the transport direction of said flexible magnetic recording medium.

11. A magnetic head according to claim 9, wherein said flexible magnetic recording medium is a magnetic tape, and lateral edges of said magnetic tape are disposed proximate to the opposite end portions of said elongated surface member.

12. A magnetic head according to claim 11, wherein said magnetic tape has a width limited by the lateral edges thereof which is greater than the width limited by the opposite end portions of said elongated surface member.

13. A magnetic head according to claim 11, wherein said pressure reducing means include cut-away portions formed in said elongated surface member proximate to the opposite end portions of said elongated surface member.

14. A magnetic head according to claim 13, wherein said cut-away portions include grooves extending in the transport direction of said magnetic tape and formed in said elongated surface member proximate to the opposite end portions thereof.

15. A magnetic head according to claim 14, wherein said plurality of electromagnetic elements are adjacent one another in a direction transverse to the transport direction of said magnetic tape and said cut-away portions include grooves formed between the outermost electromagnetic elements and electromagnetic elements adjacent thereto in said plurality of recording electromagnetic elements and in said plurality of reproduction electromagnetic elements.

16. A magnetic head according to claim 15, further comprising other grooves each having a width narrower than the width of each of the grooves of said cut-away portions being formed in said elongated surface member between respective adjacent ones of said recording electromagnetic elements and respective adjacent ones of said reproduction magnetic elements other than between the adjacent electromagnetic elements having the grooves of said cut-away portions located thereat.

17. A magnetic head according to claim 12, wherein said cut-away portions include the opposite end portions of said elongated surface member cut-away from said elongated surface member in the transport direction of said magnetic tape.

18. A magnetic head according to claim 17, wherein said cut-away opposite end portions of said elongated surface member have a smaller surface area than the surface area of the center portion of said elongated surface member.

19. A magnetic head according to claim 17, further comprising grooves formed in said elongated surface member between respective adjacent ones of each of said recording and reproduction electromagnetic elements.

* * * * *